United States Patent [19]

Wünning

[11] 4,392,818

[45] Jul. 12, 1983

[54] MULTIPLE HEAT RECUPERATION BURNER SYSTEM AND METHOD

[76] Inventor: Joachim Wünning, Bergstrasse 20, D-7250 Leonberg 7, Fed. Rep. of Germany

[21] Appl. No.: 247,832

[22] Filed: Mar. 26, 1981

[30] Foreign Application Priority Data

May 8, 1980 [DE] Fed. Rep. of Germany ....... 3017618

[51] Int. Cl.³ .............................................. F23D 11/44
[52] U.S. Cl. ...................................... 431/215; 431/11; 431/167
[58] Field of Search ................. 431/166, 167, 215, 11; 432/209; 110/302

[56] References Cited

U.S. PATENT DOCUMENTS

| | | | |
|---|---|---|---|
| 3,163,202 | 12/1964 | Schmidt et al. | 431/215 X |
| 3,212,558 | 10/1965 | Williams | 431/215 |
| 4,306,858 | 12/1981 | Simon | 431/215 X |

Primary Examiner—Edward G. Favors
Attorney, Agent, or Firm—Frishauf, Holtz, Goodman & Woodward

[57] ABSTRACT

To improve the overall efficiency of heat recuperation in a burner installation, an additional or auxiliary heat exchanger (25) is positioned adjacent the burner (4) immediately behind a heat exchanger recuperator (12) for combustion air, the additional heat exchanger having a heat carrier medium, such as water, pressurized water, heat transfer oil, or the like, circulated therethrough for recuperation of additional heat from the exhaust gases and utilization, for example for space heating, hot water supply, or the like, in a further heat exchanger (28). The heat transfer efficiency of the burner system can thereby be improved to provide for a burner operating at for example 1000° C., of final exhaust gas temperatures in the order of 200° C. which, without the additional or auxiliary heat exchanger, would be exhausted at about 500° C.

13 Claims, 1 Drawing Figure

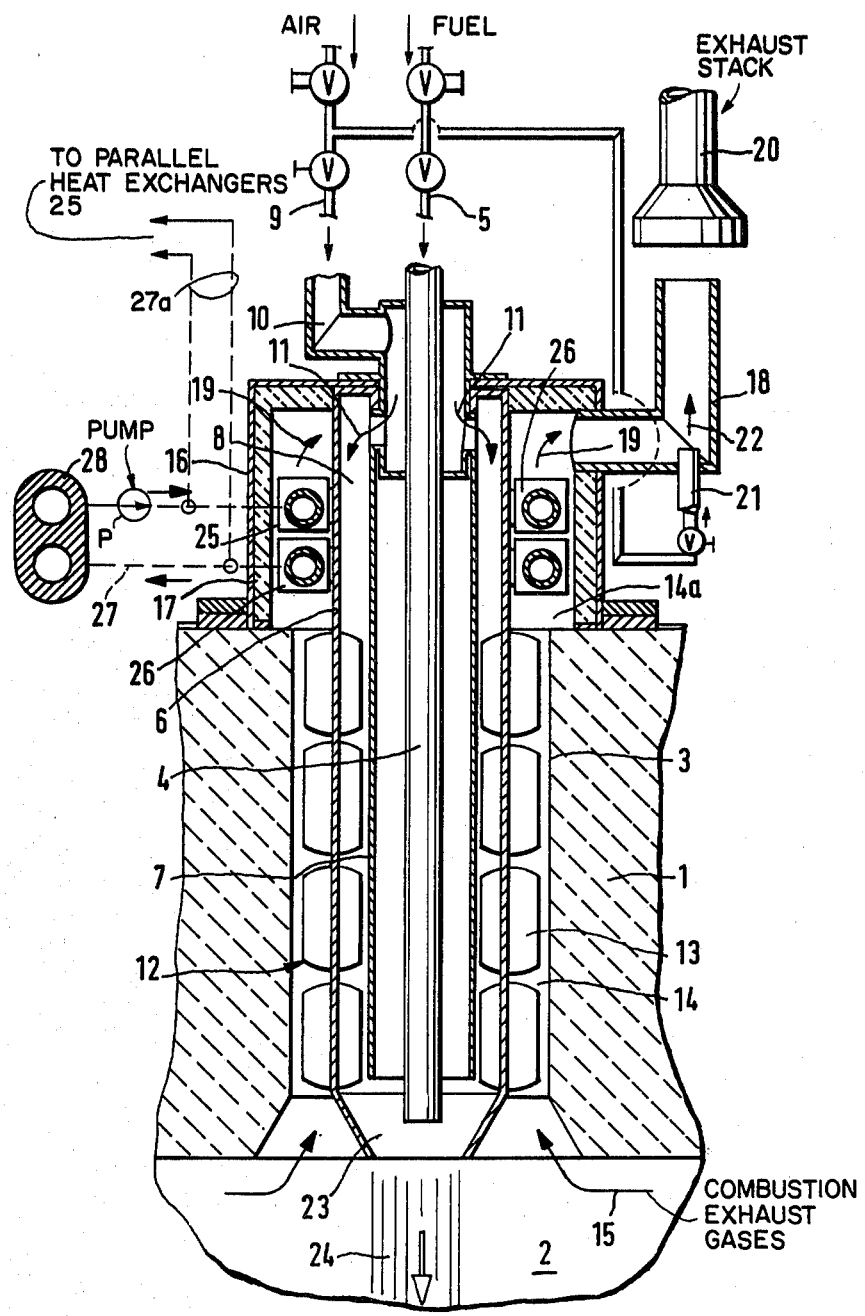

MULTIPLE HEAT RECUPERATION BURNER SYSTEM AND METHOD

Reference to related application, assigned to the assignee of this application:

U.S. Ser. No. 941,263, filed Sept. 11, 1978, Pat. No. 4,298,333, by the inventor hereof.

The present invention relates to a burner system, and to a method of operating a burner, with recuperative preheating of combustion air, and more particularly to burner systems and to a method of operations of such burners which are oil or gas-fired and used for industrial furnaces and ovens.

BACKGROUND

To supply heat to industrial furnaces, ovens, and other heat-utilizing installations, such as boilers and the like, burners accepting various types of fuel are used, and, to increase their efficiency, the combustion air is preheated. Recuperative preheating is frequently employed, that is, the exhaust or combustion gases which are still hot are used, in a heat exchanger, to transfer some of their heat to the combustion air to be supplied to the burner - see, for example, German Published Patent Application DE-OS 27 42 070, to which the referenced U.S. Ser. No. 941,263 corresponds. These recuperative burner installations are so arranged that at least a portion of the exhaust gases is returned to the immediate vicinity of the burner itself. A heat exchanger, operating as a recuperator and forming part of the burner assembly, transfer at least a portion of the exhaust gas heat to the combustion air being supplied to the burner. Approximately 60% of the exhaust gas heat can be recuperated in this way. The burner may be operated, for example, by natural gas, coal gas, or oil. Burner installations arranged for fluid energy use would, however, become excessively complex if a greater percentage of exhaust gas heat were to be recovered. The reason therefor is the limited space available, particularly for heat exchange surfaces of the recuperator. The heat capacity of the stream of exhaust gas is higher than that of the combustion air being supplied to the burner. The remaining heat in the exhaust gases, which will have a temperature of between 300° to 600° C., is lost.

THE INVENTION

It is an object to provide a burner system and method in which the remaining heat energy of the exhaust gases can still be recuperated without interfering with the operation of the burner, that is, to improve the overall efficiency of the burner operation and reduce the energy demand for an installation using heat as an energy source.

Briefly, the burner tube is immediately surrounded by a heat exchanger to preheat combustion air being supplied to the burner. In accordance with the invention, the remaining heat of the exhaust gases is recuperated by a further heat exchanger which utilizes a discrete heat carrier medium, such as water, boiler water, or an oil, and which is passed through a heat exchanger positioned immediately downstream of the combustion air heat exchanger and still forming part of the burner assembly.

Transfer of the remaining heat contained in the contact exhaust gases to the heat transfer medium in the additional heat exchanger, positioned immediately and directly, permits a simple flow path for the exhaust gases with low eventual exhaust gas temperature, so that the exhaust gases usually need not be heat-insulated at all. The exhaust gas lines can be made smaller since flow losses decrease with temperature. The customary exhaust gas injector with a draft control apparatus positioned downstream thereof for pressure equalization with the atmosphere can be retained. The operation of the burner, and the controls thereof, need not be changed since the heat recuperation from the exhaust gases by the additional heat exchanger with a separate heat transfer medium does not influence burner operation as such.

In accordance with a preferred feature of the invention, the heat transfer medium is passed through the separate heat exchanger in a closed fluid circuit at a constant flow rate. This flow rate is adjusted to be independent of the conditions under which the burner itself operates.

The heat recuperated by the additional burner can be used for various applications, such as space heating, washing, drying, or preheating of various devices, or of combustion fluids. The temperature of the heat transfer medium in the closed circuit can be matched to the demand. Water under pressure or thermal oil can be used, in which case the temperature may rise to about 250° C. if the decrease in heat recuperation, due to the higher operating temperature of the heat transfer medium, is acceptable. Industrial furnace arrangements, in which the furnace chambers are heated by more than one burner, can utilize an arrangement in which the heat transfer medium is passed through auxiliary heat exchangers coupled to each one of the burners, and connected in parallel with respect to the fluid circuit of the heat exchanger medium.

The construction of a burner with the additional or auxiliary heat exchanger is simple; at the primary side, the exhaust gases, after having passed through the combustion air recuperator, are utilized to heat the auxiliary heat exchanger. This combustion air is cooled by the auxiliary heat exchanger to a final, predetermined exhaust temperature. The burner itself is adjusted or controlled to accept the sum of the pressure drop of exhaust gases which arise in both the first heat exchanger and the second additional or auxiliary heat exchanger. No change in burner operation is necessary.

Installation of the additional auxiliary heat exchanger, or assembly thereof to a burner, is simple. The second or auxiliary heat exchanger can be constructed as a subassembly fitted to the burner. Preferably, it is constructed as a tubular ring, or circular-shaped heat exchange structure.

DRAWING

The single FIGURE is a part-sectional, part-schematic view of a burner installation with an auxiliary or additional heat exchanger having a heat transfer medium circulated therein.

The invention will be described in connection with a burner installed in the wall of a furnace, and fitted therethrough.

A furnace or oven wall 1 has a suitable opening 3 formed therein into which a burner is fitted to heat a furnace or oven chamber 2. The burner itself has a centrally positioned fuel supply tube 4 receiving fuel through a supply line 5. The fuel can be in liquid or gaseous form, or could be a slurry. The fuel supply tube 4 is surrounded, concentrically, by an air supply tube 6 which, in combination with an inner air guide tube 7, likewise concentrically positioned, defines a cylindrical air space 8 to which combustion air is supplied over an air supply line 9 connected to an air inlet stub or manifold 10. The air flow is shown by arrows 11.

The air supply tube 6 forms part of a first heat exchanger 12, operating as a recuperator. The first recuperator 12 is constructed in form of a finned or ribbed heat exchanger, having ribs or fins 13 which extend into the cylindrical space 8 on the one side and, on the other, and outwardly from the air tube 6 into a concentric cylindrical space 14 defined by the air supply tube 6 and the inner wall of the opening 3 of the burner wall 1. Arrows 15 illustrate the flow of combustion exhaust gases through the space 14. The combustion gas space 14 for the combustion gases is defined, externally of the wall 1 of the furnace, by a head portion 16 secured to the inlet or head part of the burner. The head portion 16 extends the cylindrical combustion exhaust gas space 14 of the heat exchanger into a further area or cylindrical space 14a, positioned within the head portion 16 and surrounded by a heat-insulated wall 17 of the head portion of the burner. The flue pipe 18 is connected to the cylindrical extended space 14a, guiding exhaust gases from space 14a into an exhaust gas or smoke stack 20, as seen by the arrows 19. An exhaust gas injector 21, only schematically shown and of any suitable and well known construction, is included in the flue pipe or duct 18. Exhaust gas injector 21 is connected to the air line 9, and permits injection of air into the flue pipe or duct 19, as schematically shown by arrow 22, to compensate for pressure variations in the atmosphere so that uniform and constant combustion conditions will be available for the burner.

Basic operation: Fuel supplied through fuel supply line 5 to the burner tube 4 is mixed with combustion air supplied through air line 9 into the ring space or cylindrical space 8 at the burner nozzle 23. Upon ignition, for example by an electrical igniter of any suitable and well known construction, a flame 24 will result which is directed inwardly into the furnace chamber 2 for heating the furnace chamber or any apparatus or devices therein. The combustion air passing through the cylindrical duct 8 is preheated by the heat exchanger 12 so that, in the first heat exchanger 12, the exhaust gases passing through the cylindrical space 14 will lose heat energy, and this heat will be transferred to the combustion air. The combustion exhaust gases thus will be cooled by withdrawal of some heat energy therefrom. The partially cooled combustion exhaust gases nevertheless will have a temperature of between 300° and 600° C. upon leaving the cylindrical space 14 and entering the outer cylindrical space or duct 14a of the head portion of the burner 16.

In accordance with the present invention, the heat energy still present in the exhaust gases is recuperated by positioning a second or further or additional or auxiliary heat exchanger 25 in the space 14a of the burner head. The primary side of the heat exchanger 25 is heated by the exhaust gases received from the cylindrical duct or space 14. The auxiliary heat exchanger 25 is a circular tube heat exchanger having two finned circularly placed tubes 26, coaxially positioned with respect to the burner tube 4 and, for example, spirally wrapped around the air duct tube 6 and suitably secured thereto and/or to the head portion 16 of the burner.

The secondary portion of the heat exchanger 25 has a fluid, preferably liquid heat carrier medium included therein, for example water under pressure, such as boiler water, or heat exchanger oil, or thermal oil, which is passed through the heat exchange tubes of the auxiliary heat exchanger 25 in a separate and individual heat exchange circuit over lines 27, connected, for example, to a heat utilization device or heat utilization exchanger, for example in the form of a further heat exchanger 28 positioned for space heating or, for example, available for heating of washing water, or the like.

The auxiliary heat exchanger 25 further cools the exhaust gases passing through the cylindrical exhaust gas space 14a before passing the exhaust gases through the flue duct 18 for subsequent transmission to the exhaust stack 20 and the atmosphere.

The method and apparatus are best illustrated by an example: A burner has been constructed essentially as shown in the FIGURE, with a rate power of 50 kW. The first heat exchanger 12, operating as a recuperator, has a diameter of 16 cm, and a length of 40 cm. Assuming a rate of exhaust gas flow of 56 m$^3$/h, about half of the exhaust gas heat is transferred in the first heat exchanger 12 to the combustion air. Combustion air is supplied at a rate of 50 m$^3$/h. Consequently, the temperature of the exhaust gases between the inlet and the outlet of the heat exchanger 12 drops by about half - in degrees C.

The second or auxiliary heat exchanger 25, installed in accordance with the present invention in the cylindrical space 14a of the burner head 16 had two loops of finned tubes 26, each with a diameter of 15 mm, and a finned surface of 35×35 mm. Its heat transfer value was 32 W/k, in which k=heat transfer coefficient in W/m$^2$ calories, and F the effective recovery surface in m$^2$.

The auxiliary heat exchanger 25, installed in accordance with the present invention, had water under pressure of 5 bar and 120° C. applied thereto with a flow rate of 500 kg/h. A circulating pump P was included in the fluid circuit to insure constant flow of the secondary heat exchange water.

Approximately 75% of the total heat content available from the exhaust gas can be transferred to the pressurized water in the secondary or auxiliary heat exchanger 25 under the foregoing conditions.

Let it be assumed that the combustion chamber 2 requires heat at 1000° C.; the water temperature in the fluid circuit of the second or auxiliary heat exchanger 25 is 120° C., then the following temperature relationships will obtain, in which also the utilization and efficiency of use of fuel - in percent - are shown.

Exhaust gas temperature at inlet of heat exchanger 12:
  1000° C. ($\eta=51\%$)
exhaust gas temperature, exit from heat exchanger 12:
  500° C. ($\eta=77.8\%$)
exhaust gas temperature, inlet to auxiliary heat exchanger 25:
  500° C. ($\eta=77\%$)
exhaust gas temperature at outlet from heat exchanger 25:
  220° C. ($\eta=90\%$).

The efficiency, $\eta$, relates to the overall efficiency of heat transfer.

As can be seen, the additional heat recuperation by the second or auxiliary heat exchanger 25, installed in accordance with the present invention, is about 13% or 3.3 kW, heating the water being circulated therethrough by 11° K.

The heat recuperation in the auxiliary heat exchanger 25 rises with increased temperature in the combustion chamber 2, and consequent increase in the temperature of the combustion exhaust gases. Of course, the heat recuperation drops somewhat when the temperature of the heat transfer medium being circulated in the auxiliary heat exchanger is increased. The heat recuperation can still be improved by increasing the heat transfer surfaces of the second heat exchanger 25, for example by placing more than two loops of tubes 26 in the space 14a.

The additional heat exchanger 25 in the cylindrical space 14a of the head 16 of the burner introduces a low pressure drop to the combustion exhaust gases. In the example shown, this pressure drop is below 10 mm water. The exhaust gas injector thus can operate with the pressure of the combustion air, usually about between 500 to 1,000 water. A draft controller can be interposed in the exhaust gas circuit if a plurality of burners are connected to a common exhaust stack in order to prevent mutual interference or influencing of the operation of a plurality of burners which are operated in an automatic mode.

If a plurality of burners are used, it is desirable to connect the secondary or auxiliary heat exchangers 25 of such additional burners in parallel connection, so that they jointly heat the heat transfer fluid being circulated therethrough, as schematically indicated by connecting lines 27a.

The heat exchange medium being passed through or circulated in the auxiliary heat exchanger 25 is preferably supplied at a constant flow rate, so that the flow through the auxiliary heat exchanger is independent of the controlled operating condition of the burner.

The auxiliary heat exchanger 25 can be constructed as a single constructional unit within the cylindrical space 14a of the burner head 16. The number of finned or ribbed loops of the tubes 26 can be suitably selected in accordance with the necessary heat exchange surface for the particular application involved, and for the rated burner heat capacity. Placing the auxiliary heat exchanger 25 downstream of the combustion air recuperator 12 introduces only low pressure drop therethrough, and does not add to the space requirement of the opening 3 through the furnace wall 1. No additional space, therefore, is required within the furnace wall 1 for the additional heat exchanger, and losses in the circulating fluid are low, while the air flow losses are a minimum. The other operating elements, such as the air injector 21, are not affected by the presence of the additional heat exchanger. Existing burner installations can be retrofitted by only slight modification - if even that is necessary - of the head portion of the burner and where it is fitted to the wall 1 of the furnace.

Various changes and modifications may be made, and while the particular arrangement of heat exchange types or tubes 26 as shown in the drawing is preferred, other arrangements for heat exchange can be used, for example vertically positioned finned tubes similar to those of heat exchanger 12.

I claim:

1. A method of heat recuperation to recuperate heat from a burner system comprising the steps of
   exposing hot combustion gases (15) to a first heat exchanger (12), having a first heat transfer characteristic insufficient to remove the entire heat content from said combustion gases and to lower the temperature of the combustion gases to a desired level, said first heat exchanger being in air flow communication with combustion supply air (9, 11) to preheat said combustion supply air;
   exposing said exhaust gases, while still in the burner system, to a second heat exchanger (25), having a second heat transfer characteristic, said second heat exchanger being in heat transfer communication with a heat carrier medium separate and distinct from said combustion supply air;
   circulating the heat carrier medium in parallel to a further heat exchanger;
   and conducting said heat carrier medium to a heat utilization device (28).

2. Method according to claim 1, characterized by circulating said heat carrier medium in said second heat exchanger (25) and said utilization device at a constant flow rate.

3. Burner system having
   a burner tube (4) adapted to receive a combustion fuel;
   a first heat exchanger-recuperator (12) positioned to surround said burner tube and having an inlet air duct (8) and a combustion exhaust gas duct (14);
   air inlet means (9, 10) furnishing combustion air to said inlet air duct and for supplying combustion air to the burner;
   exhaust gas conduit means (18, 20) in flow communication with said combustion exhaust gas duct, said first heat exchanger-recuperator preheating air for combustion by the burner by heat exchange with exhaust gases,
   and comprising an additional or auxiliary heat exchanger (25) positioned immediately adjacent to, and downstream of, said first heat exchanger-recuperator (12) to receive combustion exhaust gases from the combustion exhaust gas duct (14) of the first heat exchanger, said additional or auxiliary heat exchanger including means (26) in form of a ring-shaped structure (26), concentric with said first heat exchanger-recuperator (12) for confining a heat carrier medium and for cooling the exhaust gases flowing past said additional or auxiliary heat exchanger (25) prior to entry into the exhaust gas conduit means to a predetermined exhaust temperature.

4. System according to claim 3, wherein said additional or auxiliary heat exchanger (25) comprises a subassembly of the system and is unitary therewith.

5. System according to claim 3, wherein said ring-shaped structure of the additional or auxiliary heat exchanger (25) comprises a ring-tube heat exchange assembly.

6. Systems according to claim 5, wherein said ring-tube heat exchange assembly comprises at least one loop of a finned tube (26).

7. System according to claim 3, further including a burner head structure (16) concentric with said first heat exchanger-recuperator (12) and defining a cylindrical exhaust gas chamber (14a), said additional or auxiliary heat exchanger (25) being positioned within said exhaust gas chamber downstream - in the direction of exhaust gas flow - from said first heat exchanger-recuperator.

8. System according to claim 3, further including an air injection device (21) included in the exhaust gas conduit means (18).

9. System according to claim 3, further including external heat exchange means (28) in heat carrier medium fluid communication with said additional or auxiliary heat exchanger (25).

10. System according to claim 3, further including heat carrier medium connection ducts (27) connected to the heat carrier medium confining means for circulating heat carrier medium fluid through the additional or auxiliary heat exchanger (25);

and parallel connection lines (27a) connected to said connection ducts (27) for parallel connection of further heat exchangers (25) of additional burners in a multi-burner system.

11. System according to claim 3, further including a circulating pump (P) in fluid communication with the heat carrier medium confining means (26) to supply said medium in fluid form under pressure in excess of atmospheric pressure to the additional or auxiliary heat exchanger (25).

12. Burner system having
a burner tube (4) adapted to receive a combustion fuel;
a first heat exchanger-recuperator (12) positioned to surround said burner tube and having an inlet air duct (8) and a combustion exhaust gas duct (14);
air inlet means (9, 10) furnishing combustion air to said inlet air duct and for supplying combustion air to the burner;
exhaust gas conduit means (18, 20) in flow communication with said combustion exhaust gas duct, said first heat exchanger-recuperator preheating air for combustion by the burner by heat exchange with exhaust gases, and comprising
an additional or auxiliary heat exchanger (25) positioned immediately adjacent to, and downstream of, said first heat exchanger-recuperator (12) to receive combustion exhaust gases from the combustion exhaust gas duct (14) of the first heat exchanger, said additional or auxiliary heat exchanger including means (26) for confining a heat carrier medium and for cooling the exhaust gases flowing past said additional or auxiliary heat exchanger (25) prior to entry into the exhaust gas conduit means to a predetermined exhaust temperature;

heat carrier medium connection ducts (27) connected to the heat carrier medium confining means for circulating heat carrier medium fluid through the additional or auxiliary heat exchanger (25);

and parallel connection lines (27a) connected to said connection ducts (27) for parallel connection of further heat exchangers (25) of additional burners in a multi-burner system.

13. System according to claim 12, further including a circulating pump (P) in fluid communication with the heat carrier medium connecting ducts (27) and the parallel connection lines (27a) to supply said medium in fluid form under pressure in excess of atmospheric pressure to the additional or auxiliary heat exchanger and the further heat exchangers.

* * * * *